United States Patent
Stampfli

[15] 3,675,040
[45] July 4, 1972

[54] ELECTROMAGNETIC SYSTEM CONTROLLING A MOVABLE MEMBER THROUGH THE AGENCY OF A MAGNETIC FIELD

[72] Inventor: Harald Stampfli, Petit-Saconnex, Switzerland

[73] Assignee: Lucifer S.A., Carouge-Geneva, Switzerland

[22] Filed: May 5, 1970

[21] Appl. No.: 34,762

[52] U.S. Cl. ................ 307/133, 307/252 UA, 317/11 A, 317/148.5, 317/DIG. 6, 323/22 SC, 323/24
[51] Int. Cl. ........................................................ H01h 9/56
[58] Field of Search ......... 307/252 R, 252 B, 252 N, 252 UA, 307/133, 104; 323/22 ZS, 51, 90, 22 SC, 24; 317/11 A, 335 C, 148.5, DIG. 6; 321/47

[56] References Cited

UNITED STATES PATENTS

| | | | |
|---|---|---|---|
| 3,242,416 | 3/1966 | White | 321/47 |
| 3,444,456 | 5/1969 | Codichini | 323/22 SC |
| 3,486,042 | 12/1969 | Watrous | 323/22 SC |
| 3,238,390 | 3/1966 | Pinckaers | 307/252 UA |
| 3,335,291 | 8/1967 | Gutzwiller | 307/252 UA |
| 3,515,902 | 6/1970 | Howell | 307/252 B |
| 3,440,517 | 4/1969 | Page et al. | 323/22 SC X |

OTHER PUBLICATIONS

G.E. Application Notes No. 200.35 3/66 pages 11, 12 relied upon
SCR Manual (G.E. 4th Ed.) 1967 Sci. Lib TK2798-C4g, page 66 Relied Upon

*Primary Examiner*—Gerald Goldberg
*Attorney*—Emory L. Groff and Emory L. Groff, Jr.

[57] ABSTRACT

An electronic system energizing a winding adapted to produce a magnetic attraction on a movable member. In order to produce the maximum peak in amplitude of the current energizing the winding, which peak is obtained when the A.C. voltage feeding the winding passes through zero, an electronic switch is inserted between the A.C. supply and the winding to be energized, said switch becoming conductive at the moment of the reversal of current at this zero voltage. Said switch is constituted advantageously by a semi-conductor rectifier such as a SCR or thyristor associated with a diode which is rendered conductive just before the passage of the A.C. voltage through zero so as to allow current to pass through the SCR as soon as it is reversed. Other embodiments resort to a triac which is released at the actual moment of current reversal.

3 Claims, 5 Drawing Figures

PATENTED JUL 4 1972　　3,675,040

INVENTOR

HARALD STAMPFLI

BY

ATTORNEY (3,675,040)

ELECTROMAGNETIC SYSTEM CONTROLLING A MOVABLE MEMBER THROUGH THE AGENCY OF A MAGNETIC FIELD

A magnetic field is often used for technical purposes with a view to shifting a movable member, the magnetic field being produced by a winding fed by a supply of A.C.; the movable member may be constituted, for instance, by the movable armature of a relay or again by the plunger core of an electromagnet or the rotor of an electric motor. The plungers of electromagnets are used in particular for the actuation of electromagnetic valves controlling the passage of a fluid.

For various applications, it is of interest to benefit by a maximum attracting force at the moment of the energization of the winding, this being required, on the one hand, in order to overcome the friction between the different parts when at rest and, on the other hand, because the breadth of the gap of a varying size shows at the moment of said energization its highest value.

The energization of the winding at the moment at which the A.C. voltage feeding it passes through zero is a very interesting possibility, since the transient conditions are then characterized by a peak of intensity during the first pulse, which is substantially higher than the intensity which would be obtained in the same winding under continuous running conditions with a direct feed from the same supply of A.C. This first pulse of intensity reaches a value substantially equal to the maximum amplitude of the A.C. during continuous running conditions, multiplied by a coefficient depending on the ratio R/L (that is resistance against inductance) in the winding. Furthermore, it is a well-known fact that the magnetic attraction varies proportionally as the square of the intensity so that the maximum instantaneous value of said attraction may reach up to 500 percent the peak value provided by the current under continuous running conditions.

The present invention has for its object a simple and economical system providing a high initial attraction upon energization of the winding adapted to produce the magnetic field.

The present invention has for its particular object an electromagnetic system including a member adapted to move under the action of an initial high intensity magnetic field produced by a winding fed by a supply of A.C.

According to the invention, said arrangement includes an electronic switch inserted in series with the winding and designed so as to become conductive only when the voltage which is to feed the winding substantially passes through zero.

The accompanying drawing illustrates diagrammatically and by way of example several embodiments of the arrangement forming the object of the invention. In said drawing.

Figure 1:
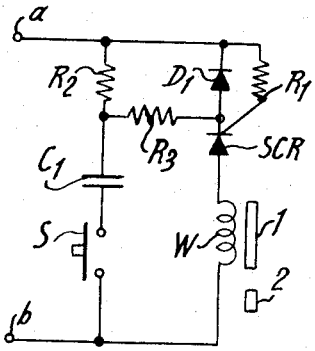
FIG. 1 is a wiring diagram of the first embodiment.

Turning to FIG. 1 illustrating the first embodiment the supply of A.C. which is not illustrated is connected across the terminals $a$ and $b$ of a circuit including a diode $D_1$, a SCR rectifier provided with a conductivity-controlling electrode, and a winding W, which three components are inserted in series. The winding W is adapted to produce a magnetic field in the stationary core 1 and to shift thus a movable member through the magnetic attraction exerted by it.

The diode $D_1$ is biased with a polarity such that it is conductive for the current passing through the SCR rectifier. The electrode or gate controlling the SCR rectifier is connected with the terminal $a$ through the resistance $R_1$.

The circuit includes furthermore a resistance $R_2$ inserted in series with a condenser $C_1$ and a switch S across the terminals $a$ and $b$, said switch being open when the system is inoperative. The point connecting the resistance $R_2$ with the condenser $C_1$ is connected through the resistance $R_3$ with the point connecting the cathode of the SCR rectifier with the anode of the diode $D_1$.

The circuit described operates as follows:

When the diode $D_1$ and the SCR rectifier are non-conductive, their condition persists as long as the switch S remains open. In order to feed the winding W, the operator closes the switch S so that the A.C. supply is applied then solely to the components $R_2 - C_1$. The current flowing through last-mentioned components is phase-shifted and leads with reference to the voltage prevailing between the terminals $a$ and $b$. When the potential at the terminal $a$ reaches the maximum of its positive voltage with reference to the terminal $b$ and begins decreasing, the condenser $C_1$ shows a positive difference in voltage between its terminal connected with the resistance $R_2$ and that connected with the switch S. Said condenser continues being loaded as long as its instantaneous voltage is smaller than that prevailing between the terminals $a$ and $b$. At the moment at which the voltage between the terminals $a$ and $b$ becomes lower than that of the condenser $C_1$, the discharge of the latter towards the supply begins and causes a current to flow through the resistance $R_2$ towards the terminal $a$. The drop in voltage across the terminals of the resistance $R_2$ is applied by the resistance $R_3$ across the cathode and the anode of the diode $D_1$. As soon as the drop in voltage across the terminals of the resistance $R_2$ has risen above the voltage threshold of the diode $D_1$, the latter becomes conductive and the drop in voltage across its terminals causes a current to flow through the resistance $R_1$ and the electrode controlling the SCR rectifier, which current is sufficient for said rectifier to enter its conductive condition. However, at such a moment, the terminal $a$ is still positive with reference to the terminal $b$, so that no current can as yet pass through the rectifier SCR.

In contradistinction, immediately when the voltage across the terminals $a$ and $b$ passes through zero, current flows through the winding W, the rectifier SCR and the diode $D_1$. Consequently, the energization of the winding W is obtained at the actual moment at which the alternating voltage fed by the supply passes through zero. The SCR rectifier remains conductive throughout the alternation during which the terminal $b$ is positive with reference to the terminal $a$. At the end of said alternation, the current has a tendency to be reversed in the diode $D_1$ and the SCR rectifier, which returns both said components to their non-conductive condition.

The above-described diagram is highly suitable in the case where it is desired to energize the winding W by means of at least one pulse sufficient for producing a magnetic field adapted to shift the movable member 2, the force required for maintaining said movable member in the position it has assumed thus being produced by an auxiliary supply of energy which is not illustrated or else by a permanent magnet.

Figure 2:
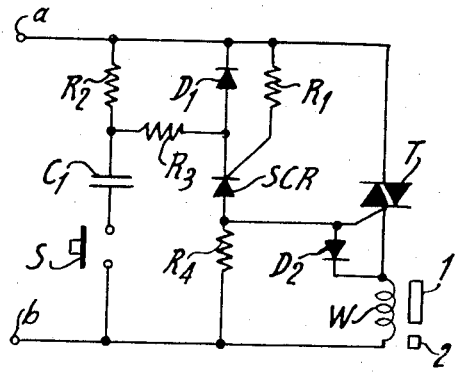
FIG. 2 illustrates an improved modification of said first embodiment.

In the second embodiment illustrated in FIG. 2, the same resistances $R_1$, $R_2$, $R_3$ are inserted in the circuit together with the condenser $C_1$, the switch S, the diode $D_1$ and the SCR rectifier, all said components being connected in the same manner as in the case of FIG. 1. However, the anode of the SCR rectifier is connected directly with the terminal $b$ through a resistance $R_4$, the drop in voltage across which generates a control signal applied to the gate of a triac T. The latter is connected in series with the winding W across the terminals $a$ and $b$. The diagram of FIG. 2 operates in the same manner as that described with reference to FIG. 1, except for the fact that the triac T is conductive for both directions of passage of the current. Said triac T remains conductive as long as the switch is closed. When the switch S is opened, the triac T becomes non-conductive as soon as the direction of current is first reversed and just before the terminal $a$ becomes negative.

The passage between the non-conductive condition and the conductive condition of the triac T can be obtained only when the SCR rectifier is itself conductive, that is during a passage through zero of the A.C. voltage between the terminals $a$ and $b$ at the moment at which the terminal $b$ becomes positive with reference to the terminal $a$.

In the embodiment illustrated in FIG. 2, the transient phenomenon characterized by a high peak value for the current intensity becomes perceptible chiefly for the first alternation affecting the conductivity of the triac T. During the following alternations, the current reaches the same level as if the winding W were connected directly with the supply of A.C.

It should be remarked that, by reason of the inductive impedance shown by the winding W, the triac T is still fed with current during the passage of the voltage through zero whereas, during the passage of the intensity through zero, the gate may again show a voltage which is comparatively large with reference to the cathode of the triac. If this voltage is sufficiently high, the triac becomes operative for the next positive alternation and it cannot therefore become automatically locked. In order to cut out such a drawback, a diode $D_2$ is inserted between the winding W and the gate of the triac. Thus, when the terminal $a$ becomes negative with reference to the terminal $b$, the self-induced current in the winding W passes through said diode $D_2$ and the resistance $R_4$ without passing through the triac T which becomes non-conductive.

Figure 3:
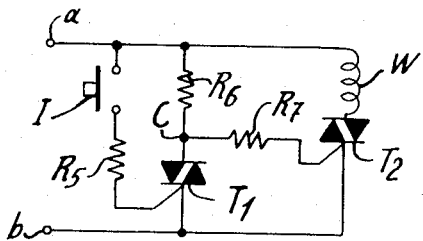
FIGS. 3 to 5 illustrate three further embodiments.

In the embodiment illustrated in FIG. 3, a supply of A.C. which is not illustrated is connected across the terminals $a$ and $b$ of the circuit including two triacs in parallel $T_1$ and $T_2$, the winding W being connected in series with the triac $T_2$. The gate of the triac $T_1$ is connected with the terminal $a$ through a resistance $R_5$ and a switch I in series therewith. The triac $T_1$ is inserted in series with a resistance $R_6$ across the terminals $a$ and $b$ and it is furthermore connected with the gate of the triac $T_2$ through a resistance $R_7$.

The operation of said circuit is as follows:

When the switch I is closed, current passes through the resistance $R_5$ and renders the triac $T_1$ conductive. The voltage at the point $c$ between the resistance $R_6$ and the triac $T_1$ is then practically equal to zero.

No current passes through $R_7$ and the entirety of the current passes through the resistance $R_6$ and the triac $T_1$.

When the switch I is opened, the triac $T_1$ is not immediately locked and therefore it is necessary to wait, by reason of the characteristic properties of the triac for the anodic current to pass through zero. The load of said triac being governed by the law of ohmic resistances, the zero of the current registers with a zero voltage.

As soon as the triac $T_1$ is locked, the following alternation produces a passage of current through $R_6$ and $R_7$ towards the gate of the triac $T_2$. The current required for energizing said triac is very small and therefore it may be considered that the triac $T_2$ is energized in practice for a zero voltage whereby the winding W is immediately energized.

It should therefore be remarked that, in the case of FIGS. 1 to 3, the current can be stopped in the winding W only when the intensity passes through zero by reason of the characteristic properties of the triacs and SCR rectifiers, and this is of advantage as it avoids any cut out overvoltage.

It should be remarked that the circuits illustrated in FIGS. 1 to 3 show the common advantage of requiring no auxiliary supply of voltage.

All the components of said circuits can operate with conventional networks, the voltages of which may reach up to 380 volts. Circuits operating in a manner similar to those described in FIGS. 1 to 3 may be executed by means of synchronizing components under low voltages and require consequently an auxiliary supply of voltage which may be obtained from the network or mains.

Figure 4:
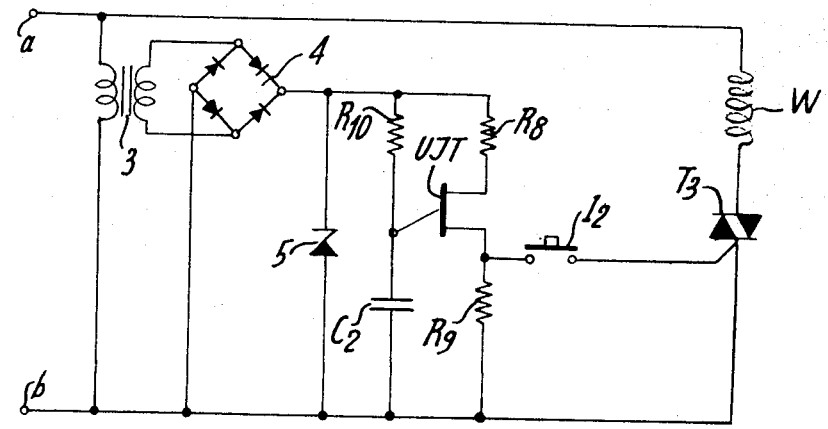

FIG. 4 shows, by way of example, a wiring diagram of a circuit of such a type executed with a single-junction transistor.

Said circuit includes a transformer 3 connected across the terminals $a$ and $b$ through its primary while its secondary feeds a rectifier 4 rectifying both alternations. Said rectifier 4 feeds a Zener diode 5, the Zener voltage of which is much lower than the peak voltage produced by the transformer 3.

Thus, there is obtained across the terminals of the Zener diode 5 a voltage formed by a succession of pulses of a trapezoidal shape. Said voltage feeds an oscillator of a conventional type including a single-junction transistor UJT, the bases of which are connected with the terminals of the Zener diode 5 by resistances $R_8$ and $R_9$, while its emitter is connected with the point joining a resistance $R_{10}$ with a condenser $C_2$, said latter components being inserted in series across the terminals of the diode 5.

The time constant of the RC components constituted by the resistance $R_{10}$ and condenser $C_2$ is selected so that the voltage releasing the transistor UJT may be obtained only after a period longer than the duration of a trapezoidal pulse across the terminals of the Zener diode 5. Thus, the single-junction transistor UJT does not become conductive throughout the duration of said pulse. In contradistinction at the end of said pulse and when the voltage across the terminals of the Zener diode sinks by reason of the passage from one alternation to the next, the two bases of the single-junction transistor drop to a voltage which is necessarily lower than that of its emitter and this releases the conductive period of the single-junction transistor. At such a moment, the condenser $C_2$ is therefore discharged into the resistance $R_9$, which produces across the terminals of the latter a pulse synchronized in practice with the passage through zero of the feed voltage.

The voltage across the terminals of the resistance $R_9$ may be fed to the gate of the triac $T_3$ by the closing of a switch $I_2$. Thus, whatever may be the moment of the closing of said switch $I_2$, the conductive condition of the triac $T_3$ can start only after production of a pulse across the terminals of the resistance $R_9$, that is during the passage through zero of the feed voltage.

Figure 5:
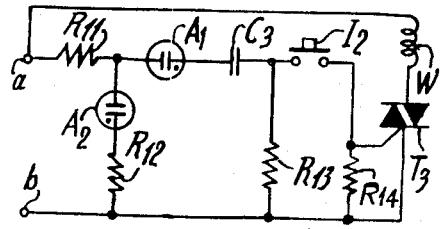

The diagram shown in FIG. 5 comprises a winding W connected in series with a triac $T_3$ across terminals $a$ and $b$, as already shown in the diagram of FIG. 4.

The control circuit of the triac $T_3$ includes a resistor $R_{11}$ connected with the terminal $a$ and with the point joining a trigger $A_1$ with a trigger $A_2$. The opposite terminal of the trigger $A_2$ is connected with terminal $b$ across a resistor $R_{12}$, while the opposite terminal of trigger $A_1$ is connected with a switch $I_2$ and with a resistor $R_{13}$ through a condenser $C_3$. The switch $I_2$ and the gate of the triac $T_3$ are connected to the terminal $b$ through resistor 14.

The triggers $A_1$ and $A_2$ may consist, for example, in neon tubes, the starting voltages of which are low and slightly different one from the other. The neon tube forming the trigger $A_1$ has a starting voltage lower than that of the tube forming the trigger $A_2$. The starting voltage of both tubes are very low in comparison of the peak value of the alternating voltage applied to the terminals $a$ and $b$.

When the value of the supply voltage passes through zero, for example when the potential of terminal $a$ increases while that of terminal $b$ decreases, no voltage appears on the near terminal of switch $I_2$ as long as the voltage across the terminals $a$ and $b$ has not reached the starting voltage of trigger $A_1$. As soon as the voltage is high enough to put the trigger $A_1$ in conductive conditions, a surge is applied to the condenser $C_3$ which discharges to form a current pulse. This pulse is of a very short duration, and its end is determined by the trigger $A_2$ at the instant it becomes conductive.

Thus, it is possible to close the switch $I_2$ at any time. However, the triac $T_3$ only receives a control pulse to make it conductive when a pulse is produced as a result of the successive conductive conditions of the triggers $A_1$ and $A_2$.

Supposing that the starting voltages of the triggers $A_1$ and $A_2$ are substantially equal to one-tenth of a peak voltage applied to the terminals $a$ and $b$, the impulse controlling the triac $T_3$ is obtained within a phase shifting less six degrees, so that a stronger magnetic attraction is obtained although the switching on is not produced definitely at the zero passage of the voltage.

It should be noted that in the diagram of FIG. 5 the condenser $C_3$ and the resistors $R_{13}$ and $R_{14}$ can be omitted, so that the trigger $A_1$ would be directly connected to the switch $I_2$. However, these elements constitute a differentiating circuit producing pulses sharper than the pulses obtained without these elements.

Obviously, the trigger elements in the diagram of FIG. 5 could be different from neon tubes. They could be constituted by Zener diodes connected in opposition, or also by diacs.

I claim:

1. An electromagnetic system for controlling a member adapted to be shifted under the action of a magnetic field produced by a winding fed by an alternating current supply, said system comprising, an alternating current supply, a winding and an electronic switch connected in series therewith and having a control electrode, a control circuit connected across said alternating current supply and adapted, upon reversal of the wave from a peak of the supply wave towards zero, to energize the control electrode of the switch thereby to operatively connect the winding with the alternating current supply through said conductive electronic switch at the very moment of the passage of said voltage through zero and a mechanical switch adapted to close said control circuit, said electronic switch being connected through said winding across the mains forming the alternating current supply, and said control circuit including two triggers having starting voltages slightly different one from the other.

2. An electromagnetic device comprising a mobile part displaceable under the influence of a magnetic field, a winding fed from a source of alternating current to produce said magnetic field, a triac connected in series with the said winding and connected to a control circuit to make it conductive only when the current intended for application to the winding passes substantially through zero, said control circuit comprising a condenser fed by the source of alternating current through a first trigger, a second trigger connected to the first trigger and having a higher current conduction threshold than the first trigger so as to cut off the feed to condenser after this feed has been ordered by said trigger.

3. The device according to claim 2, characterized in that the second trigger is connected to the two terminals of the source by a resistance at each end, said condenser being connected to one of the terminals of the source of current by the first trigger in series with one of the said resistances, said condenser also being connected through a switch to the control electrode of the triac, the connecting point between condenser and switch being connected to the other of the terminals of the source of current by a resistance.

* * * * *

UNITED STATES PATENT OFFICE
CERTIFICATE OF CORRECTION

Patent No. 3,675,040  Dated July 4, 1972

Inventor(s) HARALD STAMPFLI

It is certified that error appears in the above-identified patent and that said Letters Patent are hereby corrected as shown below:

In the heading of the patent insert the following:

Foreign Application Priority Data
May 12, 1969  Switzerland...........7264/69

Signed and sealed this 25th day of December 1973.

(SEAL)
Attest:

EDWARD M. FLETCHER, JR.  RENE D. TEGTMEYER
Attesting Officer  Acting Commissioner of Patents